(No Model.)
W. G. SPIEGEL.
MARINE SIGNAL.
No. 385,016. Patented June 26, 1888.
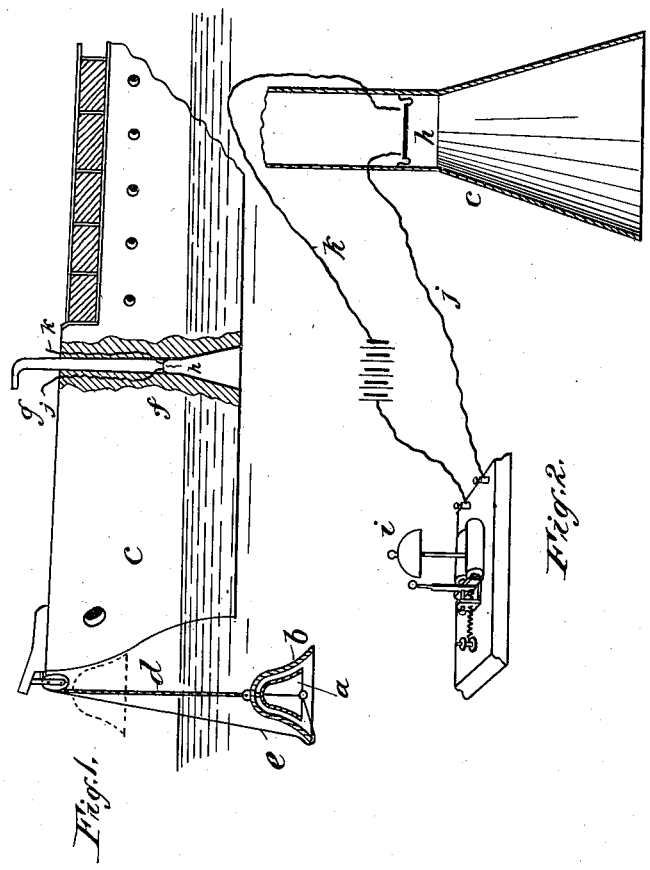
WITNESSES:
INVENTOR.
BY
ATTORNEY.

UNITED STATES PATENT OFFICE.

WILLIAM G. SPIEGEL, OF NEW YORK, N. Y., ASSIGNOR OF ONE-HALF TO SYDNEY H. CARNEY, OF SAME PLACE.

MARINE SIGNAL.

SPECIFICATION forming part of Letters Patent No. 385,016, dated June 26, 1888.

Application filed July 26, 1887. Serial No. 245,302. (No model.)

*To all whom it may concern:*

Be it known that I, WILLIAM G. SPIEGEL, a citizen of the United States, residing at New York city, in the county of New York and State of New York, have invented certain new and useful Improvements in Marine Signals; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention consists of a method of and apparatus for utilizing the great natural transmission of sound under water for a system of warning-signals and of communication between vessels and stations at sea, as hereinafter fully described, reference being made to the accompanying drawings, in which—

Figure 1 is a general outline of a vessel rigged with signal apparatus adapted for carrying out my invention, and Fig. 2 is a detail of the same.

To take advantage of the great range and rapid transmission of sound under water for warnings and for communications between vessels at sea in the night and in fogs, I propose to equip them with any approved sounder adapted for giving distinct metallic sound under water, as a bell rigged to be let down into the water from the ship any desired depth, with means for working it from the ship to make the sound; also, to provide the ship with a sound-receiver adapted to receive sound under water, as from another vessel—for instance, a trumpet-shaped tube extending from the pilot-house or other approved locality down through the vessel and opening at its mouth into the water, said tube preferably having a suitable diaphragm above the water-level for receiving and communicating the sounds directly to the ear of the pilot or other listener, and with the sound-receiver I provide any approved signal device for sounding a call of more effective note when the vessel comes within the field of sound from another vessel than the receiver is capable of—for instance, an electric signal in which the circuit will be closed by the diaphragm of the sound-receiver when vibrated by the sound-wave; but any approved form of call-signal adapted to be operated by the effect of the sound-impulses on or in the receiver may be employed. The sound-transmitting apparatus may also be varied at will. In this example I represent a bell, $a$, preferably within a diving-bell, $b$, lowered a suitable depth from the ship $c$ by the rope $d$, with a cord, $e$, to work the hammer; but any other approved metallic sound-giver may be employed, and the sounding-bell may be used without the diving-bell, although better effects are produced with it.

For the receiver I employ the funnel or trumpet shaped tube $f$, extending down through the vessel and opening at its mouth into the water, with a suitable exhaust-nozzle, $g$, for the ear at the upper end, and for the call-signal I have in this instance represented the diaphragm $h$ in the receiver with an electric call-bell, $i$, of which the circuit-wires $j\ k$ will be closed by the diaphragm when vibrated by the sound-waves.

The bell is to be raised up and suspended above water, as indicated in dotted lines, or otherwise suitably disposed of when in daylight and clear weather the signal system is not required to be in use, and, if desired, the sound-receiver may be rigged in any approved way for being lowered into the water below the ship's bottom, either through the bottom or over the side of the vessel.

I have ascertained by practical tests that a fog-horn and other such instruments contrived for producing sounds by the rush of air or vapors through them will not, when extended under water, produce the sharp penetrating sound requisite for long-range transmission under water; and my experiments have also shown me that sound rises under water, so that it must be delivered at considerable depth in order to have the wide range necessary for useful practical application as a warning device for ships at sea; hence I make use of a metallic sounder for the purpose of obtaining the kind of sound that will be effective for my purpose, and because it can be produced at great depth under water. I am aware that a steam-pipe connected with a boiler on the ship has been projected under water to produce sound, and a diaphragm has been suspended in the water to receive the same, and I do not claim such devices, broadly.

What I claim, and desire to secure by Letters Patent, is—

1. The improved system for marine signals for ships and stations at sea, consisting of the said ships or stations, each provided with a sound-transmitter and a sound-receiver, the same being a bell or other metallic sounder adapted for being suspended at great depth and producing sounds under water, and a receiving-tube extending under water and having an approved funnel-shaped receiving-mouth thereunder therefor, and an ear-nozzle above—the one for transmitting sound to and the other for receiving sounds from another ship or station—substantially as described.

2. The improved system of marine signals for ships and stations at sea, consisting of the said ships or stations, each provided with a sound-transmitter and a sound-receiver, the same being a bell or other metallic sounder adapted for suspending at great depth and producing sounds under water, a receiving-tube extending under water—the one for transmitting sound to and the other for receiving sounds from another ship or station—and a call-signal or elastic sounder connected with the receiver, substantially as described.

3. The combination, in a marine-signal apparatus, of a metallic sounder or bell adapted to be sounded under water from one ship or station, a receiving-tube in another ship or station, having an approved funnel-shaped receiving-mouth extending under water, and an ear-nozzle on the upper terminal, and also having a sound-transmitting diaphragm, said diaphragm being located above the water, substantially as described.

4. The combination, in marine-signal apparatus, of a metallic sounder or bell adapted to be sounded under water from one ship or station, a receiving-tube in another ship or station, having an approved funnel-shaped receiving-mouth extending under water, and an ear-nozzle on the upper terminal above the water, and also having a sound-transmitting diaphragm, also located above the water, and a call-signal, as an electric sounder, adapted to be set in action by the effect of the sound-waves on the diaphragm of the receiver, substantially as described.

In testimony whereof I affix my signature in presence of two witnesses.

WILLIAM G. SPIEGEL.

Witnesses:
  W. J. MORGAN,
  S. H. MORGAN.